March 17, 1970  W. VAN DER KNAAP ETAL  3,500,916
METHOD OF RECOVERING CRUDE OIL FROM A SUBSURFACE FORMATION
Filed Oct. 3, 1968

INVENTORS:
FLORIAN LEHNER
W. VAN DER KNAAP
F. VAN DAALEN
BY:
THEIR ATTORNEY

United States Patent Office 3,500,916
Patented Mar. 17, 1970

3,500,916
METHOD OF RECOVERING CRUDE OIL FROM A SUBSURFACE FORMATION
Willem van der Knaap, François van Daalen, and Florian Lehner, Rijswijk, Netherlands, assignors to Shell Oil Company, New York, N.Y., a corporation of Delaware
Filed Oct. 3, 1968, Ser. No. 764,693
Claims priority, application Netherlands, Dec. 29, 1967, 6717786
Int. Cl. E21b 43/24, 43/22
U.S. Cl. 166—272                                                     5 Claims

ABSTRACT OF THE DISCLOSURE

A method of recovering crude oil having a viscosity above 50 cp. from a subsurface formation through the use of a first component including a solvent for the crude oil and a second component including water. One of the components is injected into the formation through a first well until breakthrough at a second well, forming a passageway through the formation, and then both components are injected simultaneously through the first well and fluids including the crude oil are recovered at the second well. The second component may be heated prior to injection. The two components may be simultaneously injected as an unstable emulsion.

---

The present invention relates to a method of recovering crude oil from a subsurface formation containing crude oil of a viscosity over 50 cp. In particular the present invention relates to a crude oil recovery method in which a solvent suitable for dissolving crude oil is applied.

Methods are known in which a slug of such solvent is first injected into the formation, this slug of solvent being followed by the injection of a displacing fluid such as water. The slug of solvent in the known methods will displace the oil towards the production well by means of a piston-like action. This piston-like action, however, will often fail to occur in the range where the viscosity of the crude oil is above 50 cp. In this range the solvent and the water having densities smaller than and greater than the density of the crude oil, respectively, will pass separately over and under the crude oil, respectively, without displacing this oil effectively.

SUMMARY OF THE INVENTION

It is therefore an object of the present invention to provide a method of recovering crude oil having a viscosity higher than 50 cp., wherein use is made of a solvent as well as of an aqueous fluid.

A further object of the present invention is to provide a recovery method for high-viscosity crude oil by means of a solvent, in which only a small amount of solvent is applied, which solvent is continuously being separated from the recovered fluid and subsequently being re-injected into the crude oil-containing formation for recirculation thereof.

According to the invention, these objects have been attained by providing a method of recovering crude oil from a subsurface formation containing crude oil of a viscosity above 50 cp., wherein use is made of at least one well suitable for injecting fluids into the pore space of the formation and at least one well suitable for producing fluids from the pore space of the formation.

The injected fluid consists of a first component comprising a solvent suitable for dissolving the crude oil and having a density which is smaller than the density of the crude oil, and a second component comprising water and having a density greater than the density of the crude oil. The method includes the steps of:

(a) Injecting one of the components via one of the wells into the formation until breakthrough of this component occurs in the other well, the injection taking place at a pressure lower than the formation fracturing pressure at the injection level;

(b) Simultaneously injecting the two components into the formation via the injection well; and (c) Recovering fluids comprising crude oil via the production well.

At least the second component on being injected into the pore space of the formation may have a temperature which is higher than the original temperature of the formation.

The water in the second component on being injected into the pore space of the formation may have a temperature which is higher than the original temperature of the formation.

The invention will be described hereinafter by way of some examples of methods operating according to the principles of the invention. These principles include the use of a solvent for permanently lowering the viscosity of the crude oil, simultaneously with the use of an aqueous fluid for transporting the crude oil having a reduced viscosity, and the application of a passageway through the pore space, this passageway being filled with a fluid having a viscosity which is lower than the viscosity of the crude oil and extending between the interior of at least one injection well and at least one production well. The solvent and the aqueous fluid are simultaneously injected into this passageway.

DESCRIPTION OF THE DRAWING

Other objects, purposes and characteristic features of the present invention will be obvious from the accompanying drawing and from the following description of the invention. In describing the invention in detail, reference will be made to the accompanying drawing in which like reference characters designate corresponding parts throughout the several views, and in which.

Figure 1:
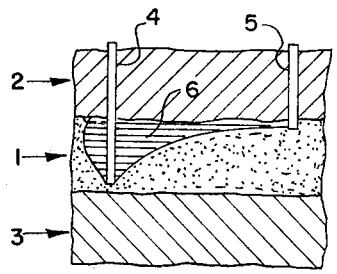
FIGURES 1 through 3 are cross-sectional views illustrating in a schematic fashion three consecutive stages of a method according to the present invention in which a passageway between the wells is formed in the upper part of a crude oil-containing formation.

In the figures of the drawings corresponding reference numerals have been applied for corresponding items. Thus, the crude oil-containing formation is indicated generally in all the figures by means of reference numeral 1. The upper and lower formations (cap and base rock, respectively) are indicated generally by the numerals 2 and 3, respectively. These latter formations, or at least the layers thereof adjoining the formation 1, are substantially impermeable to oil. Two wells are shown penetrating into the formation 1. The well 4 is suitable for the injection of fluids into the pore space of the formation 1 and to this end is equipped with the means (not shown) necessary for this purpose. Thus, the well 4 is provided with casing cemented in the borehole, and liner means or perforations in the casing being provided to provide a communication between the interior of the well and the pore space of the formation 1. Tubing means may further be provided in the casing to provide a communication between the interior of the well and the pore space of the formation 1. Tubing means may further be provided in the casing to provide a communication between the wellhead arranged on top of the casing and the formation 1. This tubing means may be equipped with insulating means to prevent leakage of heat when hot fluids are transported through the tubing.

Similar equipment (also not shown) is applied in the well 5, which is suitable to act as a production well. This includes, besides the equipment already mentioned in relation to well 4, the application of a pumping means in the well 5, such as a gas lift system or a mechanically operated plunger pump.

The injection and production wells 4 and 5 have been shown in the FIGURES 1-6 as penetrating into the formation 1 to various depths. As shown in the drawing, the depth to which the injection well penetrates is near the lower boundary of the oil saturated part of the formation 1. When applying an upper passageway 6 between the wells 4 and 5 (FIGURES 1-3) the production well 5 preferably opens in the upper part of the formation 1, during the initial stages of the recovery method. This well may be opened towards the formation 1 at a lower level during the later stages of the recovery method. If desired, the injection well 4 may in the method as described with reference to FIGURES 1-3 be opened at the same level as the production well 5.

The application of a lower passageway (FIGURES 4-6) may (as shown) be combined with a production well 5, which opens in the lower part of the formation 1. The level at which the wells in the approach, as described with reference to FIGURES 4-6, communicate with the formation pore space may, however, be lifted during the later stages of the process.

Referring now to FIGURE 1, the first step which is carried out in the crude oil-containing formation 1, after the wells 4 and 5 have been arranged therein, is the injection into the formation 1 via the well 4 of a component which comprises a solvent for dissolving the crude oil so as to form a mixture of crude oil and solvent having a viscosity which is lower than the viscosity of the crude oil. The density of this component is smaller than the density of the crude oil. The injection takes place at a pressure which is lower than the formation fracturing pressure at the injection level.

A suitable solvent for this purpose is in principle any liquid miscible with the crude oil and having a density smaller than the density of this crude oil at prevailing formation temperature and pressure. As examples there may be mentioned liquid natural gas, liquefied petroleum gas, kerosene, and light crude oil.

It will be appreciated that the word "solvents" in the present specification and in the appendant claims, is to be understood as including solvents which are in liquid form under the conditions of temperature and pressure as prevailing in the formation part of the moment that these solvents are being applied therein.

The component comprising the solvent is injected until breakthrough thereof occurs in the production well 5. Thec omponent is injected into the formation pore space at a pressure which is lower than the formation fracturing pressure at the injection level. Thus, the component flows through the pore space of the formation 1 without fracturing this formation. Since the component has a density which is smaller than the density of the crude oil, there is formed a passageway filled with the component which has partly dissolved crude oil therein, which passageway has about the form as indicated by reference numeral 6 in FIGURE 1. Since the viscosity of the liquid filling this passageway 6 is lower than the viscosity of the crude oil filling the rest of the pore space of the formation 1, the passageway 6 will be preferred as a communication between the wells 4 and 5 for fluids which are injected into the formation 1 via the well 4 and have to flow to the well 5.

Figure 2:
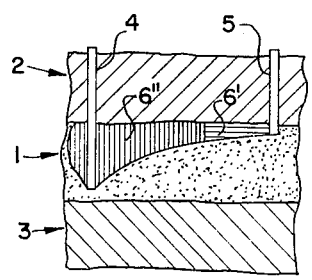

After breakthrough of the first component in the well 5, a second component comprising water is injected via the well 4 into the formation 1 simultaneously with the first component comprising the solvent. During the second stage of the recovery process, this second component will also flow through the passageway 6, in spite of the fact that the density of the second component is greater than the density of the crude oil. The first component and the second component which are simultaneously being injected thereby displace the first component from the passageway. At the moment as shown in FIGURE 2, the part 6' of the passageway is still filled with the first component only, whereas the part 6" is filled with the first component as well as with the second component.

The components may be injected into the formation 1 in any desired manner. When flowing through the passageway 6, they will separate into two layers, the first component (comprising the solvent) having the smallest density forming a layer which is superimposed on the layer consisting of the second component (comprising the water) having the greater density. This second component tends to enter the oil-saturated pore space of the formation 1, which tendency may be increased by heating the second component before it is being injected into the well 4. The second component is then heated to such a temperature that although some heat is lost during the transport of the second component down the well 4, the temperature of the second component on entering the passageway 6 is higher than the original formation temperature.

Under the expression "original formation temperature" there is herein to be understood the temperature of the formation and of the contents of the pore space thereof on the moment that the method according to the present invention is started.

Figure 3:
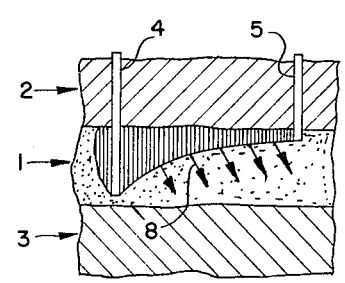

The second component when injected in heated condition, will thus decrease the viscosity of the upper part of the crude oil content of the pore space of the formation 1 by transferring part of its heat thereto, and will subsequently on account of its greater density enter the oil-saturated pore space as indicated by arrows 8 in FIGURE 3 to displace the crude oil upwardly, whereupon it comes into contact with the first component comprising the solvent. Hereby the viscosity of the crude oil is further reduced and the oil is transported together with the first component to the production well 5. A mixture comprising the two components and the crude oil is lifted in the well 5. At the surface, the oil is separated from this mixture. If desired, both components can be returned to the well 4 and (after heating) be reinjected thereinto for recirculation.

Since the lower boundary of the passageway 6 sinks to a lower level during the recovery operations, the entrance to the well 5 may be opened at a deeper level in a later stage of the present process.

It will be appreciated that the first component may consist of solvent only, whereas the second component may consist of water only, the water being pretreated to eliminate the undesirable substances thereof, which might cause plugging of the pore space.

Figure 4:
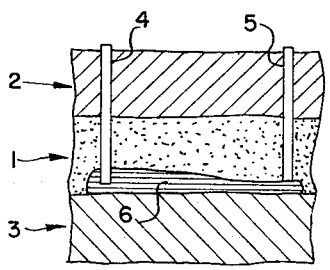
FIGURES 4 through 6 are cross-section views illustrating in a schematic fashion three consecutive stages of an alternative form of the method according to the present invention in which the passageway between the wells is formed in the lower part of the crude oil-containing formation.
Figure 5:
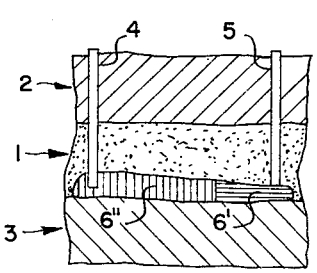
Figure 6:
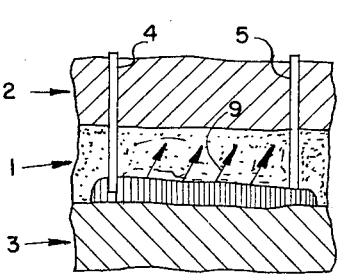

FIGURES 4-6 illustrate an alternative form of the method according to the present invention. In this alternative approach there will be only mentioned the use of a solvent and of water (instead of the first component and the second component, respectively), but it will be understood that additional substances or liquids may be added to this solvent and this water (e.g., agents for increasing the water wettability of the formation rock).

In the form of the method as will be described with reference to the FIGURES 4-6, there is pre-injected into the formation 1, via the injection well 4, a volume of water, which volume is sufficiently large to create a breakthrough of water in the production well 5. The injection pressure being chosen lower than the formation fracturing pressure at the injection level, no fracture will be formed in the formation and the water will displace the crude oil from part of the pore space. As the density of the water is greater than the density of the oil, this water will under influence of the gravity flow over the bottom of the formation 1 and thereby form the lower passageway 6 (FIGURE 4) between the wells 4 and 5. Since the viscosity of the water filling this passageway is lower than the viscosity of the crude oil filling the remainder of the pore space of the formation 1, the solvent which is injected into the well 4 simultaneously with water, after breakthrough of water in the well 5, will, although it has a smaller density than the crude oil, preferably pass through this passageway 6 being located below the oil-saturated pore space. The situation in which the pre-injected water which has formed the passageway has been partly replaced by the simultaneously injected water and solvent has been shown in FIGURE 5 (vide areas 6' and 6", respectively).

Since the density of the solvent is smaller than the density of the water, as well as of the crude oil, the solvent will have a tendency to flow in an upward direction and enter the pore space part filled with crude oil in the manner illustrated by arrows 9 in FIGURE 6. Consequently, the viscosity of the crude oil adjoining the passageway 6 is decreased and the crude oil is then transported towards the production well 5 under influence of the pressure difference which is maintained by the water and solvent flow through the passageway 6.

By applying water, which has been heated to a temperature above the original formation temperature, the viscosity of the crude oil may further be reduced which will increase the recovery rate of the oil. If desired, the water which is simultaneously being injected with the solvent may be replaced wholly or partly by steam. The injection of heated water and/or steam may, if desired, take place during only part of the injection period over which the two components are simultaneously injected.

The crude oil together with the solvent and the water is produced via the well 5, which is provided with suitable lifting equipment. The crude oil is subsequently recovered from the produced fluids. The solvent may also be separated from the produced fluid and reinjected via the well 4 into the formation for recirculation therethrough. If desired, the water may remain in the fluid after the crude oil has been separated therefrom, and be returned to the well 4 together with the solvent, for injection purposes.

If the difference in density between the crude oil and the solvent is appreciable and the viscosity of the crude oil is relatively low, there is when using this latter approach a tendency for the solvent to form a second passageway through the upper part of the formation 1. This tendency of forming a second passageway increases during the later stages of the recovery process, since then the passageway 6 will have a level near the injection well 4 which is appreciably higher than the level near the production well 5. To suppress this tendency, the solvent and the water are injected into the formation 1 in the form of an emulsion, over at least part of the injection period following breakthrough in the production well 5. This emulsion has to be unstable and has a density which is greater than the density of the crude oil. This means that the emulsion will have passed over some distance into the formation 1, before it breaks down and the solvent is freed therefrom. Since the breaking of the emulsion does not occur suddenly, the solvent is evenly distributed over the lower side of the crude oil contents of the formation, which hampers the creation of a clean solvent zone in the uppermost part of the formation 1. The instability of the emulsion may be decreased during the later stages of the production life of the formation 1.

The solvent for such a water/solvent emulsion may in principle be formed by any liquid miscible with the crude oil and having a density lower than the density of the crude oil at prevailing formation temperature and pressure. As examples of such solvent there may be mentioned liquid natural gas, liquefied petroleum gas, kerosene and light crude oil. Any suitable emulsifying agent may be applied. This agent will be adsorbed by the formation rock, which will cause a gradual breakdown of the emulsion.

If the quantity of oil recovered from the formation 1 is replaced by the injection of an equal quantity of water into the formation 1 (which will be the case at very viscous oil and/or a small permeability of the formation), the upper level of the passageway 6 (FIGURES 4–6) will rise in the later stages of the process.

It will be appreciated that the communication between the interior of the injection well 4 and the formation pore space (as well as the communication between the interior of the production well 5 and the formation pore space) may then be shifted to a higher level in the later stages of the production life of the formation 1. Such may be reached by plugging the perforations in the casings of the wells 4 and 5 and re-perforating these casings at a higher level.

Provided that the solvent and the water (or the first component and the second component) do not form a stable emulsion, they may be injected into the formation 1 during the simultaneous injection step in any desirable form. This injection may take place via a common injection tubing in the well 4 (or through the casing thereof) or through separate injection tubings, which may communicate with the formation pore space at different levels, provided that the difference in level is not too great.

In another embodiment of the invention, one of the components may be injected through the injection tubing of the injection well, whereas the other component is injected through the annular space between the injection tubing and the casing. If the two components are injected through twin wells, the outlets of these wells may not be too widely separated from each other.

While this invention has been described with particular reference to preferred embodiments thereof, it should be understood that the particular forms disclosed have been selected to facilitate explanation of the invention rather than to limit the number of forms which it may assume. Further, it should be understood that various modifications, alterations, and adaptations may be applied to the specific forms described to meet the requirements of practice without in any manner departing from the spirit of the invention or the scope of the subjoined claims.

We claim as our invention:

1. A method of recovering crude oil having a viscosity above 56 cp. from a subsurface formation through the use of a first component including solvent suitable for dissolving the crude oil and having a density which is smaller than the density of the crude oil and of a second component including water and having a density greater than the density of the crude oil, said method comprising the steps of:

providing in communication with the pore space of the formation, at least one injection well suitable for injecting fluids into the pore space and at least one prouction well suitable for producing fluids from the pore space;

injecting at a pressure lower than the formation fracturing pressure at the injection level one of the components via one of the injection wells into the formation until breakthrough of said component occurs in one of said production wells;

thereafter simultaneously injecting the two components into the formation via the injection well after the breakthrough of the first component has occurred; and producing through the production well fluids including crude oil from the formation.

2. The method according to claim 1 wherein at least the second component on being injected into the pore space of the formation has a temperature which is higher than the original formation temperature.

3. The method according to claim 1 wherein the second component upon injection into the formation via the injection well at least partially comprises steam.

4. The method according to claim 1 wherein the component injected into the formation until breakthrough occurs is the second component and wherein the two components during simultaneous injection thereof are in the form of an unstable emulsion.

5. The method according to claim 4 wherein the degree of instability of the emulsion is varied as the production of crude oil proceeds so that it remains in emulsion form for increasing periods of time.

References Cited

UNITED STATES PATENTS

| 2,669,307 | 2/1954 | Mulholland et al. | 166—274 |
| 2,862,558 | 12/1958 | Dixon | 166—272 |
| 3,065,790 | 11/1962 | Holm | 166—27 X |
| 3,215,197 | 11/1965 | Kiel | 166—269 X |
| 3,270,809 | 9/1966 | Connally et al. | 166—273 X |
| 3,376,925 | 4/1968 | Coppel | 166—27 X |

DAVID H. BROWN, Primary Examiner

IAN CALVERT, Assistant Examiner

U.S. Cl. X.R.

166—274, 275